United States Patent Office 3,291,820
Patented Dec. 13, 1966

3,291,820
ORGANOBORON ISOCYANATES AND PROCESS FOR THE PREPARATION THEREOF
Theodore L. Heying, North Haven, Conn., Joyce Ann Reid, Highland Park, N.J., and Samuel I. Trotz, Orange, Conn., assignors to Olin Mathieson Chemical Corporation, a corporation of Virginia
No Drawing. Filed Dec. 1, 1964, Ser. No. 415,862
7 Claims. (Cl. 260—453)

This invention relates to the preparation of organoboron isocyanates. More particularly, this invention relates to novel organoboron isocyanates prepared by reacting an alkali metal azide with an organoboron carboxylic acid halide and to a process for their preparation.

The organoboron carboxylic acid halides useful in the process of this invention have the formula:

$$RR^a B_{10}H_8(CR^b CR^c)$$

wherein R and $R^a$ are selected from the group consisting of hydrogen and alkyl of from 1 to 5 carbon atoms, $R^b$ and $R^c$ are each selected from the group consisting of hydrogen and —COX, wherein X is selected from the group consisting of chlorine, bromine, and iodine, and with the proviso that at least one of $R^b$ and $R^c$ is —COX. Organoboron carboxylic acid halides can be prepared by the method set forth in Ager et al. U.S. Patent 3,109,026. For example, the compound $$B_{10}H_{10}[C(COCl)]_2$$

can be prepared by refluxing a mixture of $$B_{10}H_{10}[C(COOH)]_2$$

phosphorous pentachloride and carbon tetrachloride for about 7 hours while chlorine is bubbled through the reaction mixture.

Alkali metal azides suitable as starting materials in the process of this invention include sodium, potassium, and lithium azides.

The novel reaction of this invention proceeds as shown in the following equation where, for purposes of illustration, the overall reaction between carborane-1,2-dicarboxylyl dichloride and lithium azide is shown:

$$B_{10}H_{10}[C(COCl)]_2 + 2LiN_3 \xrightarrow{\Delta} B_{10}H_{10}[C(NCO)]_2 + 2LiCl + 2N_2$$

The reaction is carried out in the presence of an inert organic solvent such as benzene, toluene, xylene, pentane, hexane, heptane, cyclohexane, pyridine, etc. Preferably the reaction is conducted at the reflux temperature of the solvent employed although temperatures ranging from about 20° C. to about 200° C. can be utilized. At the conclusion of the reaction, the alkali metal halide is removed from the reaction mixture by filtration, decantation, or by any other convenient method following which the solvent is removed under vacuum yielding the isocyanate product.

The reaction to go to completion generally requires from about 0.5 to about 50 hours or more depending on the particular reactants and reaction conditions employed. Pressures varying from subatmospheric to 10 atmospheres or more can be employed.

The novel organoboron isocyanates of this invention have the formula:

$$RR'B_{10}H_8(CR^d CR^e)$$

wherein R and R' are selected from the group consisting of hydrogen and alkyl of from 1 to 5 carbon atoms, wherein $R^d$ and $R^e$ are each selected from the group consisting of hydrogen and —NCO and wherein at least one of $R^d$ and $R^e$ is —NCO.

The novel products of this invention can be used as fuels in solid propellants. The solid products of this invention when incorporated with suitable oxidizers, such as ammonium perchlorate, potassium perchlorate, sodium perchlorate, ammonium nitrate etc., yield solid propellants suitable for rocket power plants and other jet propelled devices. Such propellants burn with high-flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as the pyrotechnic-type igniter, and are mechanically strong enough to withstand ordinary handling.

This invention is illustrated in detail in the following example which is to be considered not limitative.

*Example 1*

Two and one-half grams of carborane-1,2-dicarboxylyl dichloride, $$B_{10}H_{10}[C(COCl)]_2$$

was added to a 100-ml. Florence flask followed by 25 ml. of benzene and 1.5 g. (.0305 mole) of lithium azide prepared according to the procedure of Hofman-Bang, N., Acta Chem. Scand., 11, 581 (1957). The apparatus was arranged with a reflux condenser to condense the benzene, and attached to an inverted water-filled graduated cylinder for purposes of measuring gas evolution. Stirring and heating were initiated.

After 21 hours at reflux, the reaction mixture had evolved 438 ml. (S.T.P.) of gas. The theoretical amount of nitrogen expected was 418 ml. (S.T.P.). The amber-colored reaction mixture was filtered through a fritted disk to remove the lithium chloride. The infra-red spectrum of the filtrate showed a strong absorption at 4.45 microns characteristic of the isocyanate group and its mass spectrum was indicative of the compound $$B_{10}H_{10}[C(NCO)]_2$$

Evaporation of the benzene from a portion of the filtrate gave the organoboron isocyanate in the form of resinous solid which could not be recrystallized.

The boron-containing solid materials, produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron-containing material and from 65 to 90 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethane type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of a resin such as that mentioned previously or a pre-polymer of the resin, the proportions being such that the amount of resin is about 5 to 10 percent by weight based on the weight of oxidizer and boron compound. The ingredients are thoroughly mixed with the simultaneous removal of solvent, and following this the solvent-free mixture is molded into the desired shape, as by extrusion. Thereafter, the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

What is claimed is:
1. An isocyanate compound of the formula:

$$B_{10}H_{10}(CR^dCR^e)$$

wherein $R^d$ and $R^e$ are each selected from the group consisting of hydrogen and —NCO and wherein at least one of $R^d$ and $R^e$ is —NCO.

2. $$B_{10}H_{10}[C(NCO)]_2$$

3. A process for preparing an isocyanate which comprises reacting an azide of the formula:

$$MN_3$$

wherein M is selected from the group consisting of sodium, lithium and potassium, in the presence of an inert organic solvent with a compound of the formula:

$$B_{10}H_{10}(CR^bCR^c)$$

wherein $R^b$ and $R^c$ are each selected from the group consisting of hydrogen and —COX, wherein X is selected from the group consisting of chlorine, bromine and iodine and with the proviso that at least one $R^b$ and $R^c$ is —COX, and recovering the resulting isocyanate compound, the said reaction being conducted at a temperature between about 20° C. and about 200° C.

4. The process of claim 3 wherein the said azide is lithium azide.

5. The process of claim 3 wherein the said compound is $$B_{10}H_{10}[C(COCl)]_2$$

6. The process of claim 3 wherein the said inert organic solvent is benzene.

7. The process of claim 3 wherein the said azide is lithium azide, the said solvent is benzene and the said compound is $$B_{10}H_{10}[C(COCl)]_2$$

References Cited by the Examiner
UNITED STATES PATENTS
3,109,026  10/1963  Ager et al. ____ 260—606.5 XR
3,149,168  9/1964  Karlan et al. _____ 149—22 XR CHARLES B. PARKER, *Primary Examiner.*
CARL D. QUARFORTH, *Examiner.*
L. A. SEBASTIAN, RICHARD L. RAYMOND,
*Assistant Examiners.*